United States Patent
Villeneuve et al.

(10) Patent No.: US 9,353,680 B2
(45) Date of Patent: *May 31, 2016

(54) ROTARY INTERNAL COMBUSTION ENGINE WITH PILOT SUBCHAMBER

(71) Applicant: Pratt & Whitney Canada Corp., Longueuil (CA)

(72) Inventors: Bruno Villeneuve, Boucherville (CA); Jean-Gabriel Gauvreau, Contrecoeur (CA); David Gagnon-Martin, Longueuil (CA); André Julien, Ste-Julie (CA); Jean Thomassin, Ste-Julie (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 20 days.

This patent is subject to a terminal disclaimer.

(21) Appl. No.: 13/783,707

(22) Filed: Mar. 4, 2013

(65) Prior Publication Data

US 2014/0245988 A1 Sep. 4, 2014

(51) Int. Cl.
| | |
|---|---|
| F02B 53/04 | (2006.01) |
| F02B 53/10 | (2006.01) |
| F01C 1/22 | (2006.01) |
| F02B 19/00 | (2006.01) |
| F02B 53/00 | (2006.01) |
| F02B 19/10 | (2006.01) |
| F01C 21/06 | (2006.01) |
| F02B 53/12 | (2006.01) |
| F02B 53/14 | (2006.01) |

(52) U.S. Cl.
CPC . *F02B 53/10* (2013.01); *F01C 1/22* (2013.01); *F01C 21/06* (2013.01); *F02B 19/00* (2013.01); *F02B 19/108* (2013.01); *F02B 53/00* (2013.01); *F02B 53/12* (2013.01); *F02B 53/14* (2013.01); *F02B 2053/005* (2013.01); *Y02T 10/125* (2013.01); *Y02T 10/17* (2013.01)

(58) Field of Classification Search
CPC ...... F02B 19/00; F02B 19/10; F02B 19/1019; F02B 19/108; F02B 19/02; F02B 19/08; F02B 9/08; F02B 9/10
USPC .......... 60/39.6, 36.62, 39.63, 39.64; 123/200, 123/205, 207, 208, 209, 210, 212, 214, 231, 123/243, 273, 275, 284
See application file for complete search history.

(56) References Cited

U.S. PATENT DOCUMENTS

| | | | | |
|---|---|---|---|---|
| 2,093,339 | A | * | 9/1937 | Pipping ......................... 123/258 |
| 3,044,454 | A | * | 7/1962 | Sutton ............................ 123/263 |
| 3,102,521 | A | * | 9/1963 | Slemmons ..................... 123/263 |

(Continued)

FOREIGN PATENT DOCUMENTS

| | | |
|---|---|---|
| DE | 1926474 | 1/1970 |
| EP | 2551448 | 1/2013 |

(Continued)

*Primary Examiner* — Jorge Pereiro
*Assistant Examiner* — Jason T Newton
(74) *Attorney, Agent, or Firm* — Norton Rose Fulbright Canada (57) ABSTRACT

A rotary engine with an outer body having an insert located in the peripheral offset from the rotor cavity such that a portion of the peripheral wall extends between the insert and the cavity. The insert has a pilot subchamber defined therein and the portion of the peripheral wall has at least one opening defined therethrough in communication with the at least one outlet opening of the insert and with the cavity. A method of combusting fuel into a rotary engine is also discussed.

20 Claims, 4 Drawing Sheets

(56) References Cited

U.S. PATENT DOCUMENTS

| | | | | |
|---|---|---|---|---|
| 3,126,876 A | * | 3/1964 | Kimberley | 123/206 |
| 3,508,530 A | * | 4/1970 | Clawson | 123/275 |
| 3,857,369 A | * | 12/1974 | Sabet | 123/216 |
| 3,954,088 A | * | 5/1976 | Scott | 123/209 |
| 3,976,036 A | * | 8/1976 | Muroki et al. | 123/209 |
| 4,009,688 A | * | 3/1977 | Hayashida et al. | 123/206 |
| 4,057,038 A | | 11/1977 | Reichel et al. | |
| 4,060,058 A | * | 11/1977 | Hideg et al. | 123/209 |
| 4,091,789 A | * | 5/1978 | Jones | 123/205 |
| 4,096,828 A | * | 6/1978 | Satou et al. | 123/209 |
| 4,098,232 A | * | 7/1978 | Gleiter | 123/261 |
| 4,237,845 A | | 12/1980 | Kato et al. | |
| 4,239,023 A | * | 12/1980 | Simko | 123/275 |
| 4,259,932 A | * | 4/1981 | Hideg et al. | 123/209 |
| 4,672,933 A | * | 6/1987 | Taniguchi et al. | 123/270 |
| 4,676,207 A | * | 6/1987 | Kawamura et al. | 123/271 |
| 4,681,074 A | * | 7/1987 | Ogawa et al. | 123/271 |
| 5,065,714 A | * | 11/1991 | Matsuoka | 123/254 |
| 6,125,813 A | * | 10/2000 | Louthan et al. | 123/209 |
| 2013/0000596 A1 | | 1/2013 | Diaz Escano | |

FOREIGN PATENT DOCUMENTS

| | | |
|---|---|---|
| WO | 98/57037 | 12/1998 |
| WO | 2011/092365 | 8/2011 |

* cited by examiner

ROTARY INTERNAL COMBUSTION ENGINE WITH PILOT SUBCHAMBER

TECHNICAL FIELD

The application relates generally to a rotary internal combustion engines, and more particularly to a pilot subchamber in such engines.

BACKGROUND OF THE ART

Rotary engines, such as for example Wankel engines, use the rotation of a piston to convert pressure into a rotating motion, instead of using reciprocating pistons. In these engines, the rotor typically includes a number of seals that remain in contact with a peripheral wall of the rotor cavity of the engine throughout the rotational motion of the rotor to create a plurality of rotating chambers when the rotor rotates.

Rotary engines come in many forms. One well-known type, the Wankel engine, has a generally triangular rotor received in a two-lobed epitrochoid cavity. Other non-Wankel rotary engines types exist as well. However, known arrangements are not optimized, in terms of combustion arrangements and characteristics, and thus room for improvement exists.

SUMMARY

In one aspect, there is provided a rotary engine comprising: an outer body having an internal cavity defined by two axially spaced apart end walls and a peripheral wall extending between the end walls; a rotor body rotatable within the cavity in sealing engagement with the peripheral and end walls and defining at least one chamber of variable volume in the cavity around the rotor body; an insert located in the peripheral wall of the outer body offset from the cavity with a portion of the peripheral wall extending between the insert and the cavity, the insert having a pilot subchamber defined therein and at least one outlet opening defined therein in communication with the subchamber, the portion of the peripheral wall having at least one opening defined therethrough in communication with the at least one outlet opening of the insert and with the cavity to provide communication between the subchamber and the cavity; a pilot fuel injector having a tip in communication with the subchamber; an ignition element positioned to ignite fuel within the subchamber; and a main fuel injector having a tip in communication with the cavity at a location spaced apart from the insert.

In another aspect, there is provided an outer body for a rotary engine comprising: two axially spaced apart end walls; a peripheral wall extending between the end walls and defining an internal cavity therewith for receiving a rotor therein; an insert surrounded by the peripheral wall such as to be outwardly offset from the cavity, the insert having a pilot subchamber defined therein and at least one outlet opening defined therein in communication with the subchamber, the peripheral wall having at least one opening defined therethrough in communication with the at least one outlet opening of the insert and with the cavity to provide communication between the subchamber and the cavity; and the outer body further having: a pilot injector hole defined therethrough in communication with the subchamber and sized to receive a pilot fuel injector, an ignition element hole defined therethrough sized to receive an ignition element in communication with the subchamber, and a main fuel injector hole defined therethrough in communication with the cavity, spaced apart from the insert and sized to receive a main fuel injector.

In a further aspect, there is provided a method of combusting fuel in a rotary engine having a rotor rotating in a cavity, the method comprising: injecting a minor portion of the fuel into a subchamber defined in an insert surrounded by a peripheral wall of the engine; igniting the fuel within the subchamber; partially restricting a flow of the ignited fuel from the subchamber by circulating the ignited fuel out of the subchamber and of the insert; circulating the ignited fuel from the insert to the cavity through at least one opening defined in the peripheral wall; and injecting a remainder of the fuel into the cavity independently of and spaced apart from the subchamber.

DESCRIPTION OF THE DRAWINGS

Reference is now made to the accompanying figures in which.

DETAILED DESCRIPTION

Figure 1:
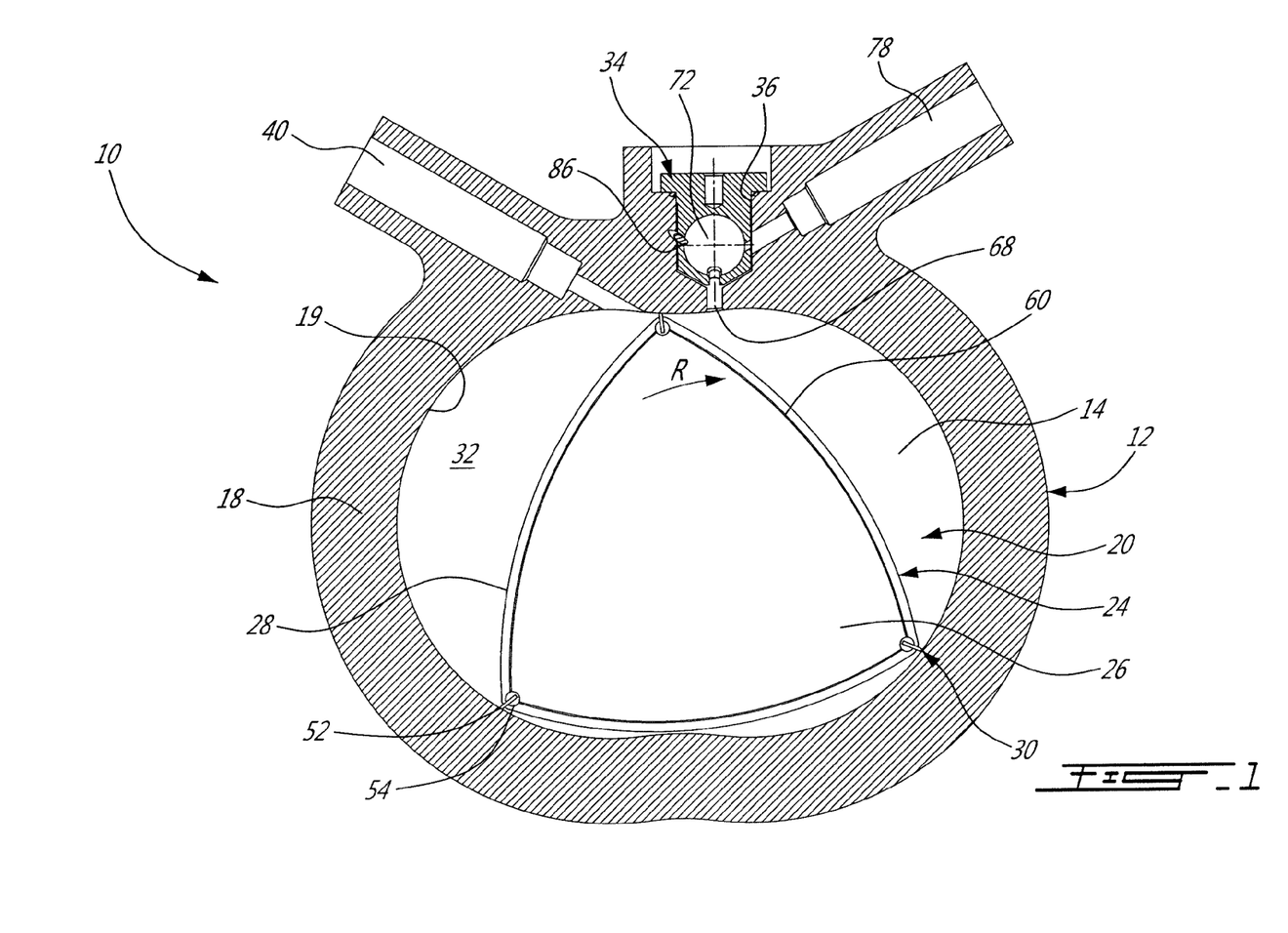
FIG. 1 is a schematic cross-sectional view of a rotary internal combustion engine in accordance with a particular embodiment.

Referring to FIG. 1, a rotary internal combustion engine 10 known as a Wankel engine is schematically and partially shown. In a particular embodiment, the rotary engine 10 is used in a compound cycle engine system such as described in Lents et al.'s U.S. Pat. No. 7,753,036 issued Jul. 13, 2010 or as described in Julien et al.'s U.S. Pat. No. 7,775,044 issued Aug. 17, 2010, the entire contents of both of which are incorporated by reference herein. The compound cycle engine system may be used as a prime mover engine, such as on an aircraft or other vehicle, or in any other suitable application. In any event, in such a system, air is compressed by a compressor before entering the Wankel engine, and the engine drives one or more turbine(s) of the compound engine. In another embodiment, the rotary engine 10 is used without a turbocharger, with air at atmospheric pressure.

The engine 10 comprises an outer body 12 having axially-spaced end walls 14 with a peripheral wall 18 extending therebetween to form a rotor cavity 20. The inner surface 19 of the peripheral wall 18 of the cavity 20 has a profile defining two lobes, which is preferably an epitrochoid.

An inner body or rotor 24 is received within the cavity 20, with the geometrical axis of the rotor 24 being offset from and parallel to the axis of the outer body 12. The rotor 24 has axially spaced end faces 26 adjacent to the outer body end walls 14, and a peripheral face 28 extending therebetween. The peripheral face 28 defines three circumferentially-spaced apex portions 30 and a generally triangular profile with outwardly arched sides. The apex portions 30 are in sealing engagement with the inner surface of peripheral wall 18 to form three rotating working chambers 32 between the inner rotor 24 and outer body 12. A recess 38 (see FIG. 3) is defined in the peripheral face 28 of the rotor 24 between each pair of adjacent apex portions 30, to form part of the corresponding chamber 32.

The working chambers 32 are sealed. Each rotor apex portion 30 has an apex seal 52 extending from one end face 26 to the other and protruding radially from the peripheral face 28. Each apex seal 52 is biased radially outwardly against the peripheral wall 18 through a respective spring. An end seal 54 engages each end of each apex seal 52, and is biased against the respective end wall 14 through a suitable spring. Each end face 26 of the rotor 24 has at least one arc-shaped face seal 60 running from each apex portion 30 to each adjacent apex portion 30, adjacent to but inwardly of the rotor periphery throughout its length. A spring urges each face seal 60 axially outwardly so that the face seal 60 projects axially away from the adjacent rotor end face 26 into sealing engagement with the adjacent end wall 14 of the cavity. Each face seal 60 is in sealing engagement with the end seal 54 adjacent each end thereof.

Although not shown in the Figures, the rotor 24 is journaled on an eccentric portion of a shaft and includes a phasing gear co-axial with the rotor axis, which is meshed with a fixed stator phasing gear secured to the outer body co-axially with the shaft. The shaft rotates the rotor 24 and the meshed gears guide the rotor 24 to perform orbital revolutions within the rotor cavity. The shaft rotates three times for each complete rotation of the rotor 24 as it moves around the rotor cavity 20. Oil seals are provided around the phasing gear to prevent leakage flow of lubricating oil radially outwardly thereof between the respective rotor end face 26 and outer body end wall 14.

At least one inlet port (not shown) is defined through one of the end walls 14 or the peripheral wall 18 for admitting air (atmospheric or compressed) into one of the working chambers 32, and at least one exhaust port (not shown) is defined through one of the end walls 14 or the peripheral wall 18 for discharge of the exhaust gases from the working chambers 32. The inlet and exhaust ports are positioned relative to each other and relative to the ignition member and fuel injectors (further described below) such that during each rotation of the rotor 24, each chamber 32 moves around the cavity 20 with a variable volume to undergo the four phases of intake, compression, expansion and exhaust, these phases being similar to the strokes in a reciprocating-type internal combustion engine having a four-stroke cycle.

In a particular embodiment, these ports are arranged such that the rotary engine 10 operates under the principle of the Miller or Atkinson cycle, with its volumetric compression ratio lower than its volumetric expansion ratio. In another embodiment, the ports are arranged such that the volumetric compression and expansion ratios are equal or similar to one another.

As described further below, a pilot subchamber 72 is defined in the outer body 12, for pilot fuel injection and ignition. In the embodiment shown, the pilot subchamber 72 is provided in an insert 34 received in a corresponding hole 36 defined through the peripheral wall 18 of the outer body 12. The peripheral wall 18 also has a main injector elongated hole 40 defined therethrough, in communication with the rotor cavity 20 and spaced apart from the insert 34. A main fuel injector 42 (see FIG. 3) is received and retained within this corresponding hole 40, with the tip 44 of the main injector 42 communicating with the cavity 20 at a point spaced apart from the insert 34. The main injector 42 is located rearwardly of the insert 34 with respect to the direction R of the rotor rotation and revolution, and is angled to direct fuel forwardly into each of the rotating chambers 32 sequentially with a tip hole pattern designed for an adequate spray.

Figure 2:
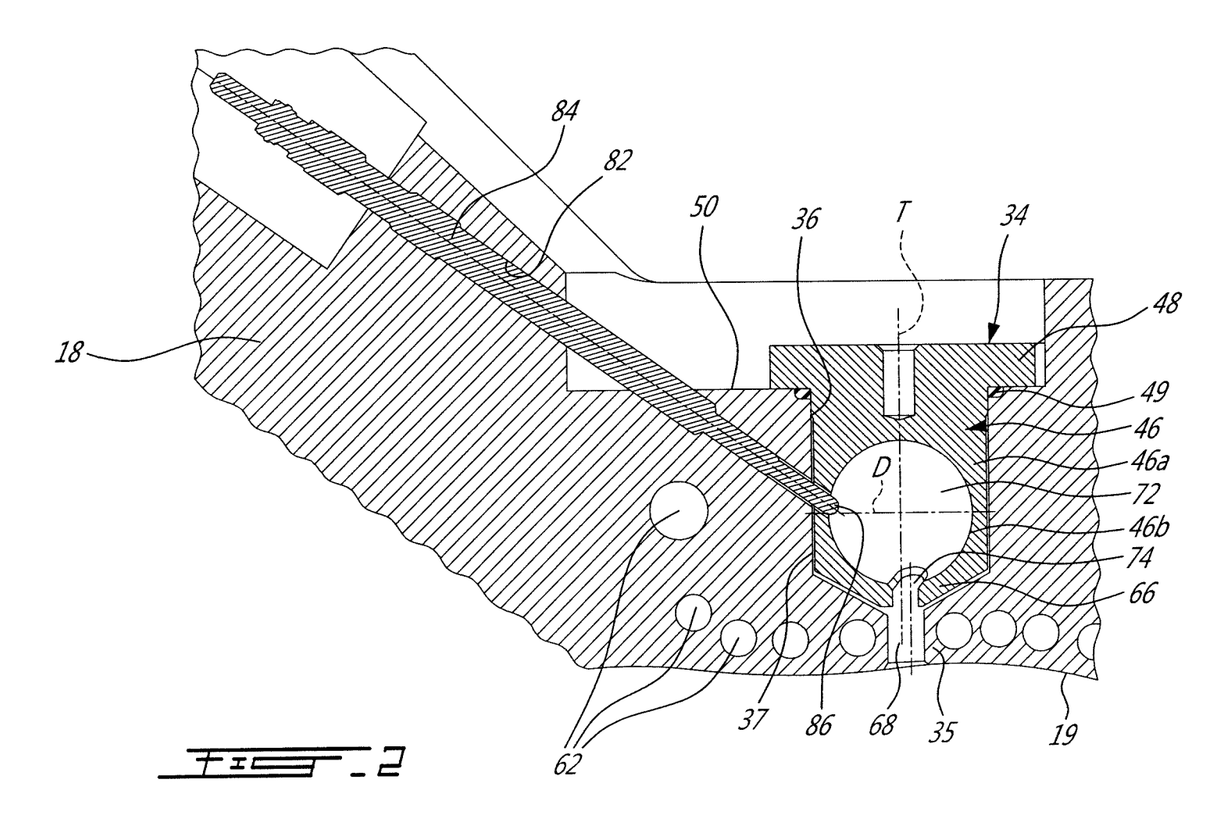
FIG. 2 is a schematic cross-sectional view of an insert of a rotary engine such as the engine of FIG. 1 in accordance with a particular embodiment.
Figure 3:
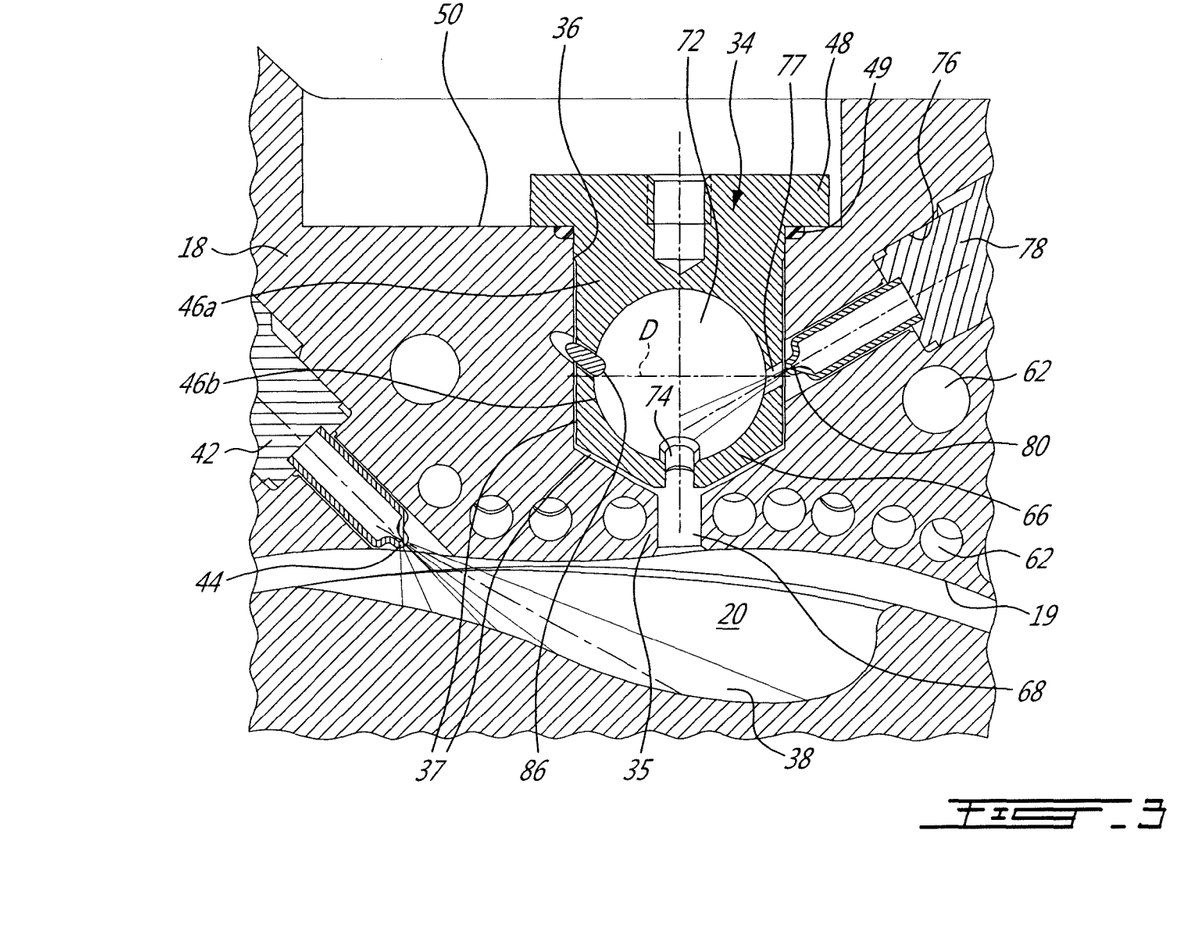
FIG. 3 is another schematic cross-sectional view of the insert of FIG. 2.

Referring particularly to FIGS. 2-3, the insert 34 is located in the peripheral wall 18 outwardly offset from the cavity 20 such that a portion 35 of the peripheral wall 18 extends between the insert 34 and the cavity 20. The insert 34 includes a body 46 and an enlarged flange 48 at its outer end, the flange 48 abutting a shoulder 50 defined in the peripheral wall 18. A seal 49 made of an appropriate type of material such as Inconel® may be received under the flange 48, shown here as being received in an adjacent indent of the peripheral wall 18. In a particular embodiment, the insert 34 is retained by a plurality of fasteners (not shown), e.g. bolts, engaging the flange 48 to the shoulder 50. Alternate types of connections can also be used, including but not limited to welding, brazing, retention through a cover overlapping the flange 48 and connected to the peripheral wall 18, etc. In the embodiment shown, a central threaded hole is be provided to receive a threaded tool facilitating removal of the insert 34 from the hole 36 when required, for example for maintenance or replacement; in another embodiment, this threaded hole is omitted.

The insert body 46 has an inner end 66 outwardly offset from the inner surface 19 of the peripheral wall 18 defining the cavity 20, i.e. the insert 34 is not directly exposed the cavity 20. In other words, the insert 34 is surrounded by the peripheral wall 18 to avoid having a portion of the inner surface 19 of the cavity 20 being defined by the insert 34. Such a configuration may allow for a lower temperature of the inner surface 19, which may also help prevent premature ignition (detonation) of the fuel mixture.

In the embodiment shown, the insert body 46 has a cylindrical shape except for the inner end 66 which is frustoconical. The insert body 46 has the entire pilot subchamber 72 defined therein, shown here with a circular cross-section. Other geometries are also possible.

The portion 35 of the peripheral wall 18 extending between the insert 34 and the cavity 20 has at least one opening 68 defined therethrough extending from the inner surface 19 to the insert hole 36. The subchamber 72 communicates with the cavity 20 through at least one outlet opening 74 defined in the insert body 46 in communication with the at least one opening 68 of the peripheral wall portion 35 and with the subchamber 72. In the embodiment shown, the subchamber 72 has a shape forming a reduced cross-section adjacent the opening(s) 74, such that the opening(s) 74 define a restriction to the flow between the subchamber 72 and the cavity 20. The opening(s) 74 may have various shapes and or be defined by a pattern of multiple holes.

In the embodiment shown, the insert 34 and insert hole 36 are relatively sized such that an air gap 37 is defined between the insert body 46 and the peripheral wall 18. In particular, an air gap is provided between the inner end 66 and the portion 35 of the peripheral wall 18 to avoid contact due to difference in thermal expansion, for example to reduce a risk of deformation of the inner surface 19. In a particular embodiment, such a gap helps in limiting heat transfer between the insert 34 and the peripheral wall 18. In a particular embodiment, the gap is sized such that with maximal thermal expansion and in the worse dimensions within geometrical tolerances, a gap remains between the inner end 66 and the portion 35. Alternate dimensions are also possible. For example, where the connection of the insert 34 with the peripheral wall 18 allows for outward thermal expansion, i.e. in a direction away from the cavity 20, the gap between the inner end 66 and the portion 35 may be omitted.

In a particular embodiment, the insert 34 is made of a material having a greater high temperature properties and or lower thermal conductivity than that of the peripheral wall 18, which may be for example made of aluminum. In one embodiment, the insert 34 is made of a nickel or cobalt based super alloy. In a particular embodiment, the insert body 46 is manufactured in two pieces 46a, 46b, for example machined from metal blanks, with interconnected surfaces D extending along a diameter of the subchamber 72. Alternate materials can be used, including but not limited to appropriate types of ceramic. Alternate manufacturing methods can also be used.

In another embodiment, both the insert 34 and the peripheral wall 18 are made of a same material having sufficient heat resistance and adequate high temperature properties to resist the high temperatures within the subchamber 72.

The peripheral wall 18 and insert body 46 have an ignition element elongated hole 82 defined therein, angled with respect to the transverse axis T of the insert 34 and in communication with the subchamber 72. An ignition element 84 is received and retained within the corresponding hole 82, with the tip 86 of the ignition element 84 being received in the subchamber 72. In the embodiment shown, the ignition element 84 is a glow plug and a major part thereof extends within the peripheral wall 18 outside of the insert 34. In a particular embodiment, the portion of the glow plug 84 located within the insert 34 is not substantially greater than the tip thereof which is actively heated in use, which may be for example from about 0.125 to about 0.25 inch (3.175-6.35 mm) in length, with the sheath and the body of the glow plug 84 extending within the peripheral wall 18 outside of the insert 34. As such, only a small portion of the ignition element 84 protrudes in the chamber 72.

Other configurations are also possible, including for example having the ignition element 84 completely received within the insert 34, and or ignition element(s) 84 of any other adequate type, including but not limited to plasma ignition, laser ignition, spark plug, microwave, other types of heating elements, etc.

In the embodiment shown, the peripheral wall 18 has a plurality of cooling channels 62 defined therein. The cooling channels 62 are in fluid communication with a coolant source (not shown) for circulation of a coolant fluid therethrough, such as for example water or water with a suitable antifreeze additive. In a particular embodiment, the location of the glow plug 84 within the peripheral wall 18 places it in heat exchange relationship with some of the cooling channels 62 to help extract heat from the glow plug 84 for improved durability.

In a particular embodiment, one or more of the cooling channels 62 (a plurality in the embodiment shown) are defined in the portion 35 of the peripheral wall 18 which extends between the insert 34 and the cavity 20. Such a configuration may help obtain a lower temperature of the inner surface 19, which may also help prevent premature ignition (detonation) of the fuel mixture.

Referring particularly to FIG. 3, the peripheral wall 18 has a pilot injector elongated hole 76 defined therethrough, also at an angle with respect to the insert 34 and in communication with the subchamber 72. A pilot fuel injector 78 is received and retained within the corresponding hole 76, with the tip 80 of the pilot injector 78 being in communication with the subchamber 72, for example by terminating in a corresponding opening 77 defined in the insert body 46 between the subchamber 72 and the pilot injector hole 76. Other configurations are also possible, including for example having the pilot fuel injector 78 completely received within the insert 34.

The pilot injector 78 and main injector 42 inject fuel, which in a particular embodiment is heavy fuel e.g. diesel, kerosene (jet fuel), equivalent biofuel, etc. into the chambers 32. Alternately, the fuel may be any other adequate type of fuel suitable for injection as described, including non-heavy fuel such as for example gasoline or liquid hydrogen fuel. In a particular embodiment, at least 0.5% and up to 20% of the fuel is injected through the pilot injector 78, and the remainder is injected through the main injector 42. In another particular embodiment, at most 10% of the fuel is injected through the pilot injector 78. In another particular embodiment, at most 5% of the fuel is injected through the pilot injector 78. The main injector 42 injects the fuel such that each rotating chamber 32 when in the combustion phase contains a lean mixture of air and fuel.

The volume of the subchamber 72 is selected to obtain a stoichiometric mixture around ignition within an acceptable delay, with some of the exhaust product from the previous combustion cycle remaining in the subchamber 72. In a particular embodiment, the volume of the subchamber 72 is at least 0.5% and up to 3.5% of the displacement volume, with the displacement volume being defined as the difference between the maximum and minimum volumes of one chamber 32. In another particular embodiment, the volume of the subchamber 72 corresponds to from about 0.625% to about 1.25% of the displacement volume.

The volume of the subchamber 72 may also be defined as a portion of the combustion volume, which is the sum of the minimum chamber volume $V_{min}$ (including the recess 38) and the volume of the subchamber $V_2$ itself. In a particular embodiment the subchamber 72 has a volume corresponding to from 5% to 25% of the combustion volume, i.e. $V_2$=5% to 25% of $(V_2+V_{min})$. In another particular embodiment, the subchamber 72 has a volume corresponding to from 10% to 12% of the combustion volume, i.e. $V_2$=10% to 12% of $(V_2+V_{min})$.

Figure 4:
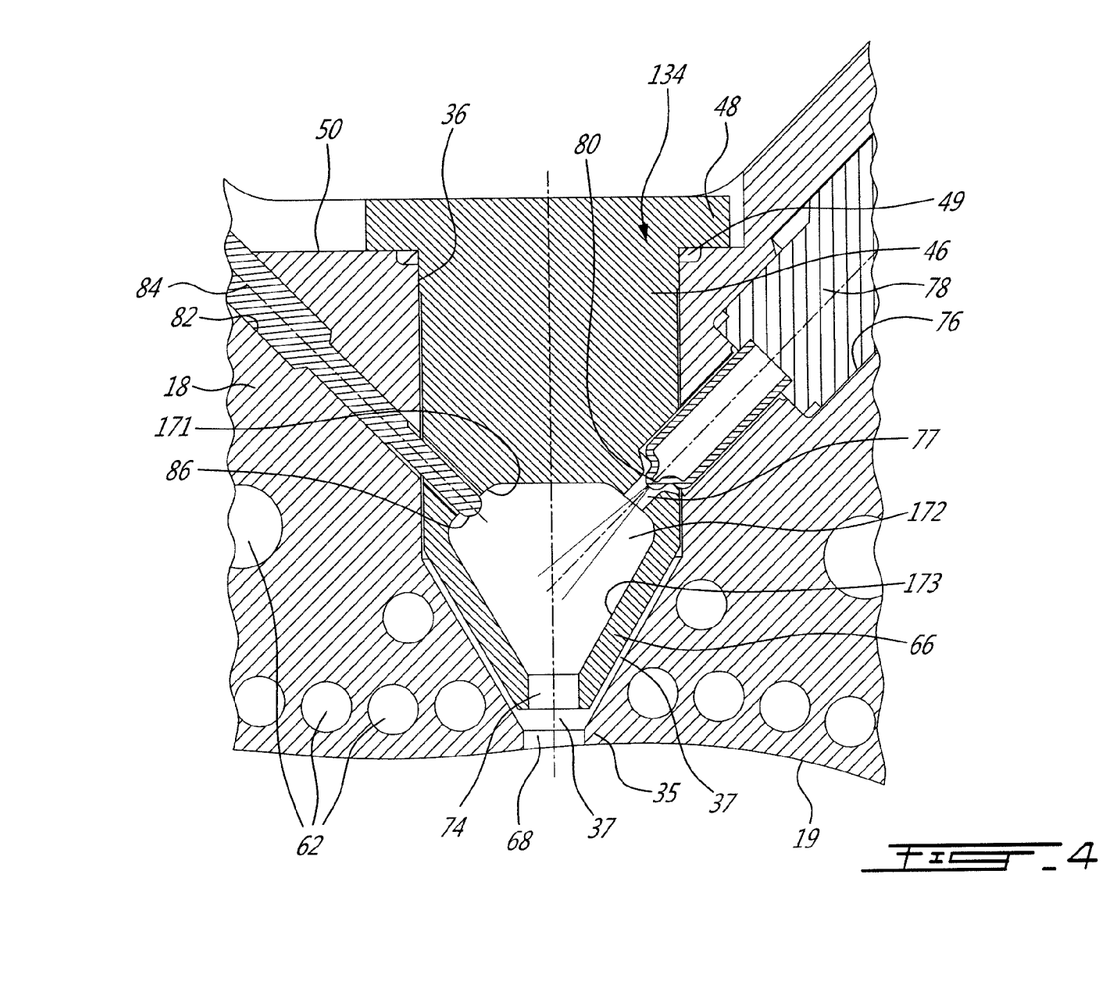
FIG. 4 is a schematic cross-sectional view of an insert of a rotary engine such as the engine of FIG. 1 in accordance with another particular embodiment.

Referring to FIG. 4, an insert 134 according to another embodiment is shown. The insert 134 is similar to the insert 34 described above, and as such similar elements are identified by the same reference numerals and will not be further described herein. A portion 35 of the peripheral wall 18 extends between the insert 134 and the cavity 20, i.e. the inner end 66 of the insert body 46 is outwardly offset from the inner surface 19 such that the insert body 46 is not directly exposed to the cavity 20.

The pilot subchamber 172 defined the insert 134 has a cross-section defining a frustoconical outer portion 171 and a frustoconical inner portion 173, with the frutoconical portions 171, 173 tapering away from each other. The at least one insert outlet opening 74 in communication with the at least one peripheral wall opening 68 is defined at the inner end of the inner portion 173. The subchamber 172 thus has a shape forming a reduced cross-section adjacent the opening(s) 74, such that the opening(s) 74 define a restriction to the flow between the subchamber 172 and the cavity 20. The opening(s) 74 may have various shapes and or be defined by a pattern of multiple holes.

In the embodiment shown, the ignition element 84 is also a glow plug with a major part thereof extending within the peripheral wall 18 outside of the insert 34. Some of the cooling channels 62 are defined in the portion 35 of the peripheral wall 18 which extends between the insert 134 and the cavity 20.

Although the insert 134 is shown with as having a cylindrical shape except for the inner end 66 which is frustoconical, other geometries are also possible.

Other geometries for the subchamber 72, 172 are also possible, including but not limited to cylindrical, conical, other wedge-shaped profiles, etc.

The subchamber 72, 172 may help create a stable and powerful ignition zone to ignite the overall lean main combustion chamber 32 to create the stratified charge combustion. The subchamber 72, 172 may improve combustion stability, particularly but not exclusively for a rotary engine which operates with heavy fuel below the self ignition of fuel. The insert 34, 134 made of a heat resistant material may advantageously create a hot wall around the subchamber which may further help with ignition stability. The position of the insert 34, 134 outwardly offset from the cavity 20 may allow for a lower temperature of the inner surface 19, which in turn may reduce the risk of detonation.

The teachings herein are applicable to many rotary engine types, and not just Wankel engines. In a particular embodiment, the rotary engine may be a single or eccentric type rotary engine in which the rotor rotates about a fixed center of rotation. For example, the rotary engine may be a sliding vane engine, such as described in U.S. Pat. No. 5,524,587 issued Jun. 11, 1996 or in U.S. Pat. No. 5,522,356 issued Jun. 4, 1996, the entire contents of both of which are incorporated by reference herein. In another particular embodiment, the rotary engine may be an oscillatory rotating engine, including two or more rotors rotating at different angular velocities, causing the distance between portions of the rotors to vary and as such the chamber volume to change. In another particular embodiment, the rotary engine may be a planetary rotating engine having a different geometry than that of the Wankel engine, such as for example a planetary engine having a rotor cavity with an epitrochoid profile defining three lobes and a rotor with four apex portions. Examples of such non-Wankel rotary engines are shown in Applicant's U.S. application Ser. No. 13/750,523 filed Jan. 25, 2013, the entire contents of which is incorporated by reference herein. Other rotary engines geometries are also possible.

The above description is meant to be exemplary only, and one skilled in the art will recognize that changes may be made to the embodiments described without departing from the scope of the invention(s) disclosed. For example, the mechanical arrangements of the rotary engines described above are merely examples of many possible configurations which are suitable for use with the present invention(s). Any suitable injector configuration and arrangement may be used. Hence, modifications which fall within the scope of the present invention will be apparent to those skilled in the art, in light of a review of this disclosure, and such modifications are intended to fall within the appended claims.

The invention claimed is:

1. A rotary engine comprising:
   an outer body having an internal cavity defined by two axially spaced apart end walls and a peripheral wall extending between the end walls;
   a rotor body rotatable within the cavity in sealing engagement with the peripheral and end walls and defining at least one chamber of variable volume in the cavity around the rotor body;
   an insert made of a material different from that of the peripheral wall, the insert having opposed inner and outer ends, the insert located in the peripheral wall of the outer body with the inner end closer to the internal cavity than the outer end, the inner end offset from the cavity with a portion of the peripheral wall extending between the inner end and the cavity, the insert having a pilot subchamber defined therein and at least one outlet opening defined therein in communication with the pilot subchamber, the portion of the peripheral wall extending between the inner end and the cavity having at least one opening defined therethrough in communication with the at least one outlet opening of the insert and with the cavity to provide communication between the pilot subchamber and the cavity;
   a pilot fuel injector having a tip in communication with the pilot subchamber;
   an ignition element positioned to ignite fuel within the pilot subchamber; and
   a main fuel injector having a tip in communication with the cavity at a location spaced apart from the insert.

2. The engine as defined in claim 1, wherein the internal cavity defines an epitrochoid shape with two lobes, the rotor body has three circumferentially spaced apex portions, and the at least one chamber include three rotating chambers of variable volume, the rotor body being engaged to an eccentric portion of a shaft to rotate and perform orbital revolutions within the cavity with each of the apex portions remaining in sealing engagement with the peripheral wall and separating the chambers.

3. The engine as defined in claim 1, wherein the portion of the peripheral wall extending between the insert and the cavity has at least one cooling channel defined therein.

4. The engine as defined in claim 1, wherein the material of the insert has one or both of greater high temperature properties and lower thermal conductivity than that of the peripheral wall.

5. The engine as defined in claim 1, wherein the material of the insert has greater high temperature properties than that of aluminum.

6. The engine as defined in claim 1, wherein a major part of the ignition element extends within the peripheral wall outside of the insert with only a tip of the ignition element being received in the pilot subchamber.

7. The engine as defined in claim 1, wherein the pilot subchamber has a shape forming a reduced cross-section adjacent the at least one outlet opening.

8. The engine as defined in claim 1, wherein the pilot injector extends in a pilot injector hole defined in the peripheral wall at an angle with respect to the insert with a tip of the pilot injector terminating in an opening defined in the insert in communication with the pilot subchamber and the pilot injector hole.

9. The engine as defined in claim 1, wherein an air gap is defined between an inner end of the insert and the portion of the peripheral wall.

10. An outer body for a rotary engine comprising:
    two axially spaced apart end walls;
    a peripheral wall extending between the end walls and defining an internal cavity therewith for receiving a rotor therein;
    an insert made of a material different from that of the peripheral wall, the insert surrounded by the peripheral wall and having an inner end outwardly offset from an inner surface of the peripheral wall defining the cavity, the insert having a pilot subchamber defined therein and at least one outlet opening defined therein in communication with the pilot subchamber, the peripheral wall having at least one opening defined therethrough in communication with the at least one outlet opening of the insert and with the cavity to provide communication between the pilot subchamber and the cavity; and
    the outer body further having:
    a pilot injector hole defined therethrough in communication with the pilot subchamber and sized to receive a pilot fuel injector, an ignition element hole defined therethrough sized to receive an ignition element in communication with the pilot subchamber, and a main fuel injector hole defined therethrough in communication with the cavity, spaced apart from the insert and sized to receive a main fuel injector.

11. The outer body as defined in claim 10, wherein the internal cavity defines an epitrochoid shape with two lobes.

12. The outer body as defined in claim 10, wherein a portion of the peripheral wall extending between the insert and the cavity has at least one cooling channel defined therein.

13. The outer body as defined in claim 10, wherein the material of the insert has one or both of greater high temperature properties and lower thermal conductivity than that of the peripheral wall.

14. The outer body as defined in claim 10, wherein the material of the insert has greater high temperature properties than that of aluminum.

15. The outer body as defined in claim 10, wherein a major part of the ignition element hole is defined through the peripheral wall outside of the insert.

16. The outer body as defined in claim 10, wherein the pilot subchamber has a shape forming a reduced cross-section adjacent the at least one outlet opening.

17. The outer body as defined in claim 10, wherein an air gap is defined between an inner end of the insert and the portion of the peripheral wall.

18. A method of combusting fuel in a rotary engine having a rotor rotating in a cavity, the method comprising:

injecting a minor portion of the fuel into a subchamber defined in an insert surrounded by a peripheral wall of the engine, the insert having an inner end offset from the cavity with a portion of the peripheral wall extending between the inner end and the cavity, the insert and peripheral wall being made of different materials;

igniting the fuel within the subchamber with an ignition element;

partially restricting a flow of the ignited fuel from the subchamber by circulating the ignited fuel out of the subchamber and of the insert through an opening of the insert spaced apart from the ignition element;

circulating the ignited fuel from the opening to the cavity through a portion of the peripheral wall extending between the insert and the cavity; and injecting a remainder of the fuel into the cavity independently of and spaced apart from the subchamber.

19. The method as defined in claim 18, wherein the fuel is heavy fuel.

20. The method as defined in claim 18, further including circulating coolant within the peripheral wall in proximity of the circulation of the ignited fuel from the insert to the cavity.

* * * * *